United States Patent [19]

Lawson

[11] Patent Number: 4,967,506
[45] Date of Patent: Nov. 6, 1990

[54] APPARATUS FOR HOLDING A TREE IN AN UPRIGHT POSITION

[76] Inventor: Thomas L. Lawson, 7106 S. 141 St., Omaha, Nebr. 68138

[21] Appl. No.: 897,080

[22] Filed: Aug. 18, 1986

[51] Int. Cl.⁵ .......................................... A01G 17/06
[52] U.S. Cl. .......................................................... 47/44
[58] Field of Search ...................................... 47/20–27, 47/31, 32, 39, 42, 43–47; 52/104, 155; 256/23, 28, 29, 36, 44, DIG. 2; 273/29 R–29 BG; 135/118; 411/457, 470, 475, 481

[56] References Cited

U.S. PATENT DOCUMENTS

| D. 272,044 | 1/1984 | Fesler | 411/475 X |
|---|---|---|---|
| 325,184 | 8/1885 | Nichols | 47/23 |
| 383,824 | 5/1888 | Newell et al. | 47/25 |
| 516,632 | 3/1894 | Leonard | 47/47 |
| 539,782 | 5/1895 | Wright | 256/35 |
| 578,100 | 3/1897 | Hay | 411/481 X |
| 644,976 | 3/1900 | Gibson | 411/457 |
| 740,740 | 10/1903 | Brown | 47/43 |
| 754,241 | 3/1904 | Roll | 119/109 |
| 977,615 | 12/1910 | Goss | 411/457 X |
| 1,127,087 | 2/1915 | Phillips | 135/118 |
| 1,691,480 | 11/1928 | Hirst et al. | 273/29 BA |
| 1,844,024 | 2/1932 | Weber | 47/44 |
| 2,296,217 | 9/1942 | Maloney | 47/44 |
| 2,862,334 | 12/1958 | Sandrig | 47/47 |
| 3,010,256 | 11/1961 | Ise | 47/42 |
| 3,040,477 | 6/1962 | June | 47/42 |
| 3,521,401 | 7/1970 | Shisler | 47/43 |
| 3,883,844 | 8/1972 | Wilkin | 116/119 |
| 4,073,090 | 2/1978 | Lucia | 47/43 |
| 4,257,200 | 3/1981 | Hensley | 411/470 X |
| 4,318,246 | 3/1982 | Jungbluth | 47/42 |
| 4,319,428 | 3/1982 | Fox | 47/42 |
| 4,562,662 | 1/1986 | Ten Pas | 47/43 |
| 4,649,666 | 3/1987 | Ness et al. | 47/44 X |

FOREIGN PATENT DOCUMENTS

| 1465465 | 12/1966 | France | 47/32 |
|---|---|---|---|
| 107 | of 1910 | United Kingdom | 47/43 |
| 688846 | 3/1953 | United Kingdom | 47/44 |

Primary Examiner—James R. Feyrer
Attorney, Agent, or Firm—Zarley, McKee, Thomte, Voorhees & Sease

[57] ABSTRACT

An apparatus for supporting a tree in an upright position includes a cord having one end removably connected to the tree and the other end removably connected to a ground anchor. The ground anchor is generally in the shape of an inverted J, both legs of the "J" being inserted in the ground such that only a very small loop projects from the ground. A hook on the anchor-end of the cord is connected to the projecting anchor. The projecting portion of the anchor is only slightly above ground level so removal of the cord from the anchor will allow a mower to pass thereover.

5 Claims, 1 Drawing Sheet

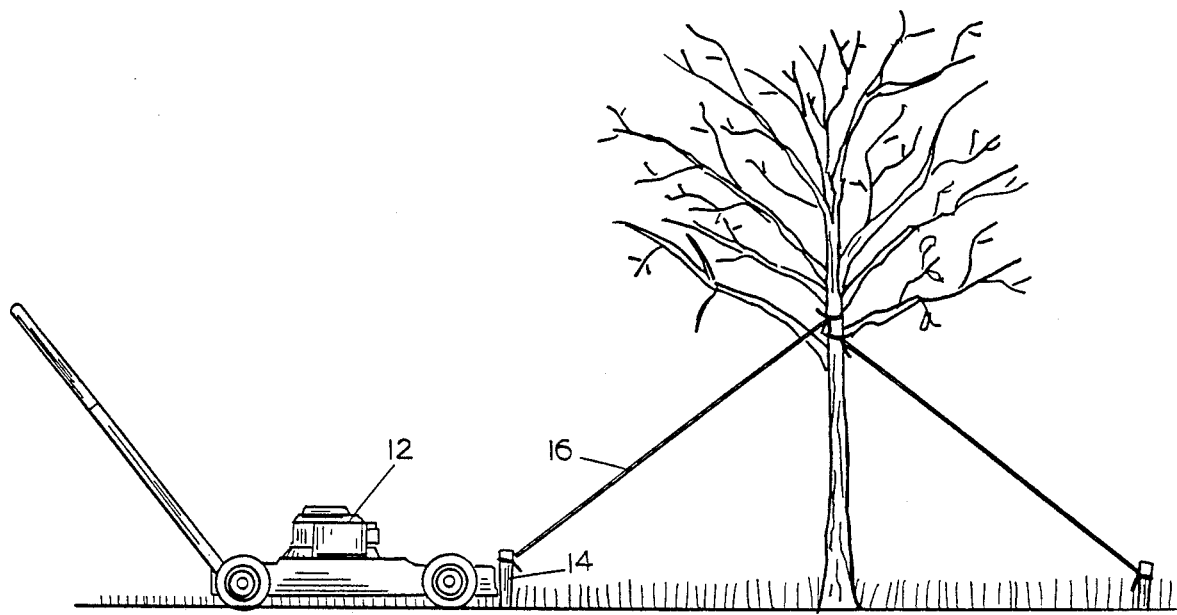
FIG. 1 (PRIOR ART)
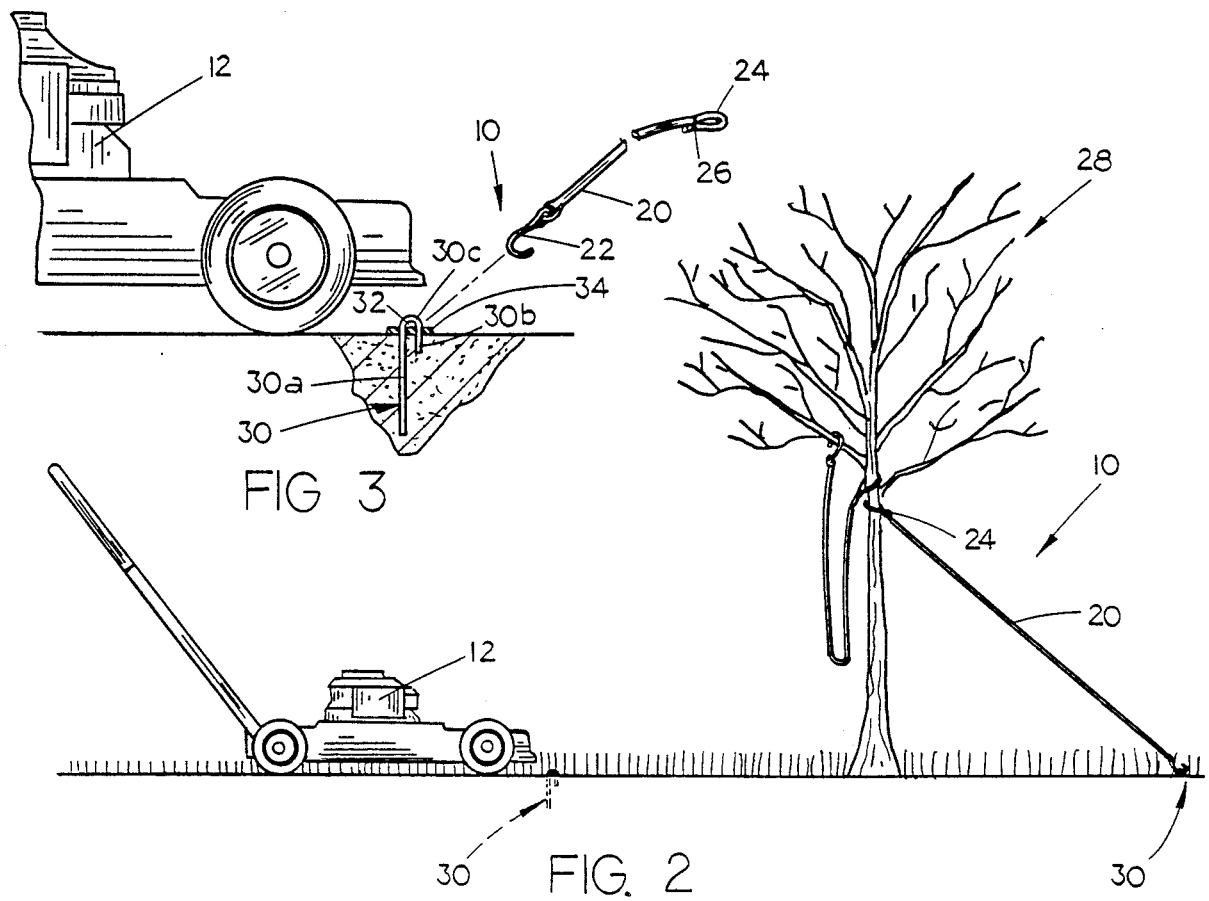
FIG. 3
FIG. 2

APPARATUS FOR HOLDING A TREE IN AN UPRIGHT POSITION

TECHNICAL FIELD

This invention relates generally to apparatus for holding a tree in an upright position, and more particularly to removably connecting a tree to ground-supported anchors.

BACKGROUND OF THE INVENTION

One of the better known problems encountered while mowing a lawn is the necessity of having to mow around stakes utilized in supporting a tree in an upright position. Since it is quite difficult to remove the wire from the stakes or remove the stakes without having to entirely restake the tree, the area around the stakes and wires are typically left for later trimming with small clippers or the like. The wire extending from the stake to the tree is also typically a nuisance in that it is difficult to mow under or around. These wires are typically low enough to get caught in some part of the mower, or handle or the person pushing the mower.

Furthermore, the stakes and wires used to support the tree are typically unsightly, especially when long grass is left around them, accentuating their presence.

It is therefore an object of the present invention to provide an improved apparatus for supporting a tree in an upright position.

Another object is to provide a tree support means which will allow easy mowing of the grass around the support means, without having to trim later.

Yet another object is to provide a support means which may be easily unfastened and reattached to a tree.

Still another object of the present invention is to provide a support means which is attractive, simple, and economical to manufacture.

These and other objects will be apparent to those skilled in the art.

SUMMARY OF THE INVENTION

Apparatus for supporting a tree in an upright position is provided which includes cords having one end removably connected to a tree and the other end removably connected to a ground anchor. The ground anchor is generally in the shape of an inverted "J", both legs of the "J" being inserted in the ground such that only a very small loop projects from the ground to which the cord is connected. A hook on the anchor-end of the cord is connected to the projecting anchor. The projecting portion of the anchor is only slightly above ground level such that it will not interfere with a mower blade during a mowing operation. The cords have a resilient elastic portion which will allow the tree to sway in the wind.

BRIEF DESCRIPTION OF THE DRAWING

FIG. 1 is an elevational view of a prior art device for securing a tree.

FIG. 2 is an elevational view of the present invention, with one cord disconnected.

FIG. 3 is an enlarged view of a portion of FIG. 2.

DESCRIPTION OF THE PREFERRED EMBODIMENT

Referring now to the drawings, in which corresponding parts have the same reference numeral throughout the sketches, the problems found in the prior art are clearly evident in FIG. 1. The mower 12 cannot get sufficiently close to stake 14 or under wire 16 to mow the adjacent grass.

FIGS. 2 and 3 show the present invention, designated generally at 10, which includes a plurality of cords 20 with a hook 22 mounted on one end. The other end of each cord 20 has a loop 24 formed therein by folding the cord back on itself and fastening it in position with a staple 26 or the like. Cords 20 are preferably of a solid rubber material for strength and elasticity. However, it is contemplated that the cords could be composed of an inelastic material with a resilient, elastic section. The resilient elasticity of the cord, or the elastic section, allows the tree to sway in the wind, and be returned to its original upright position.

The loop end 24 of each cord may be removably connected to a tree 28 by wrapping the cord around the tree trunk and inserting hook 22 through the loop end 24 and pulling it through and tightening it, much like a slipknot. Typically, cord 20 will be attached to a tree trunk above a branch such that looped end 24 will not slide down the trunk.

FIG. 2 shows one cord 20 attached between a tree 28 and a ground anchor 30, and another cord 20 attached to the tree 28 and removed from the ground anchor 30 and temporarily hooked in the tree 28. It can therefore be seen that the lawn may be mowed easily without interfering with either the disconnected cord 20 or its corresponding anchor 30.

Each anchor 30 is generally in the shape of an inverted "J". Since only one leg 30a of anchor 30 need be deeply embedded in the ground, the other leg 30b may be short, thereby forming the "J". Short leg 30b maintains anchor 30 in a nonrotatable position in the ground. The legs 30a and 30b are connected by a horizontal cross-piece 30c which projects slightly above the ground when anchor 30 is in position in the ground.

Anchor 30 may be of steel or other strong material such that the cross-piece 30c may be of small diameter. This is necessary so that anchor 30 can be driven into the ground and only have a very small loop 32 formed by cross-piece 30c projecting above the ground. Although anchor 30 may project up to an inch or more above the ground without interfering with the conventional height of a mower blade, it is preferable that loop 32 have the lowest height possible. This height depends only upon the size of hook 22 at the end of cord 20.

A flat washer 34 with a pair of apertures corresponding to legs 30a and 30b of anchor 30, is slipped onto anchor 30 just prior to imbedding the anchor 30 in the ground. Cross-piece 30c and washer 34 are painted a bright color so that the user may easily locate anchors 30 after cords 20 have been unhooked. Since washer 32 is flat, it does not require anchor 30 to project any further from the ground, it produces a large bright colored area when viewed from above. Thus, anchor 30 (and washer 34) are virtually invisible from a side view because of the projecting grass.

It can therefore be seen that cord 20 may be easily removed from an anchor 30 and hooked in the tree out of the way of a person mowing the lawn. Since anchor 30 projects only slightly from the ground it is well out of the way of the mower blade. Also, this low profile is virtually invisible from a distance, so that a more aesthetic appearance is possible for a secured tree. The bright colored cross-piece 30c allows the user to easily find anchor 30 to replace hook 22 after mowing.

It can therefore be seen that the invention accomplishes at least all of the above stated objectives.

What is claimed is:

1. An apparatus for holding a tree in an upright position comprising:
   an elongated cord of resilient, longitudinally stretchable material, having opposite ends;
   hook means mounted on one end of said cord;
   attaching means on the other end of said cord for attaching said cord to a tree trunk;
   an anchor adapted to be partially embedded in the ground spaced away from the trunk of a tree, said anchor having a pair of parallel legs connected at their upper ends by a transverse cross-piece, said anchor adapted to removably receive said hook means;
   a flat washer means having a pair of spaced apart apertures near the center thereof through which the legs of said anchor will project, said legs projecting through said washer means for embedding in the ground, whereby said washer means will restrain the cross-piece of said anchor from entering the ground;
   said cross-piece being generally arcuate such that the intermediate portion thereof is spaced above said washer means when said legs are embedded in the ground to their full extent, the arcuate shape of said cross-piece restraining the cross-piece from being positioned flush against the said washer means.

2. The apparatus of claim 1, wherein said anchor is a generally "J"-shaped small-diameter cylindrical rod, for easy insertion into the ground.

3. The apparatus for holding a tree as described in claim 1, wherein
   said anchor means projecting portion is less than one inch above the ground.

4. The apparatus for holding a tree as described in claim 1, wherein one the legs is longer than the other, such that said anchor is generally in the shape of an inverted "J".

5. The apparatus for holding a tree as described in claim 1, wherein
   said first attaching means is a loop formed by folding the cord back on itself and fastening it in position, the other end of the cord being inserted through the formed loop to create a slipknot about a tree trunk, and wherein said second attaching means is a hook means.

* * * * *